Feb. 12, 1952 P. W. NOSKER 2,585,030
APPARATUS FOR LAUNCHING AERIAL
TORPEDOES FROM AIRCRAFT
Original Filed July 13, 1943 2 SHEETS—SHEET 1
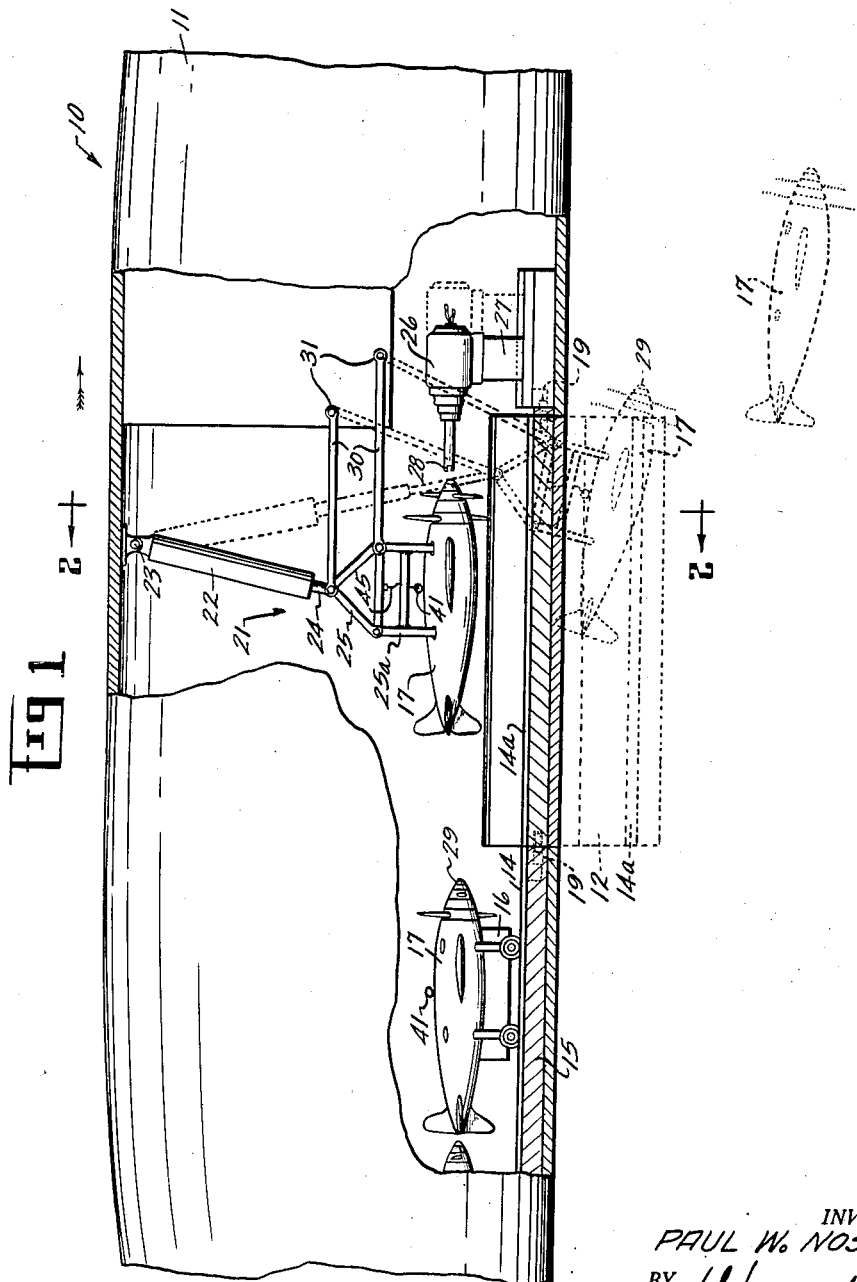
INVENTOR.
PAUL W. NOSKER
BY Wade Koontz
Chester Tietig and
ATTORNEYS Feb. 12, 1952 — P. W. NOSKER — 2,585,030
APPARATUS FOR LAUNCHING AERIAL TORPEDOES FROM AIRCRAFT
Original Filed July 13, 1943 — 2 SHEETS—SHEET 2
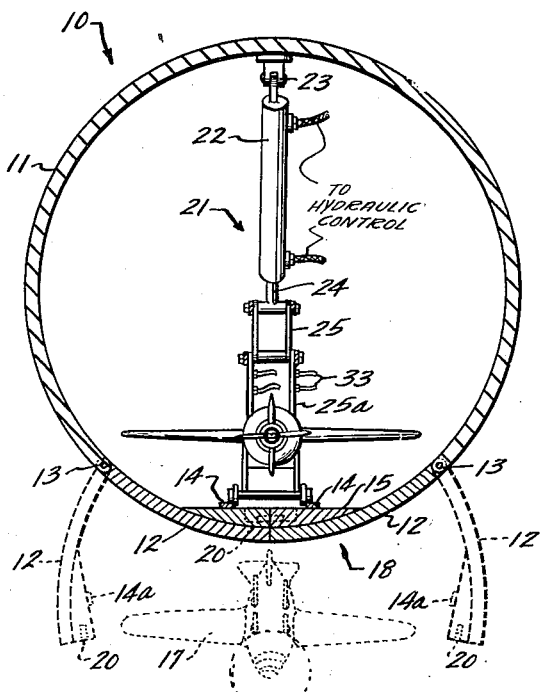
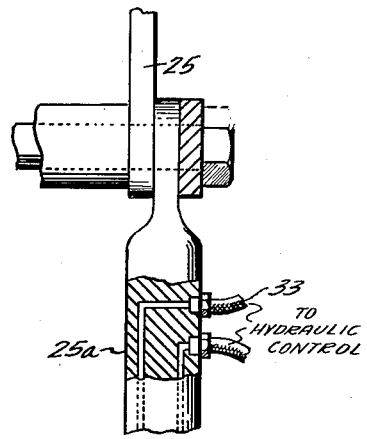
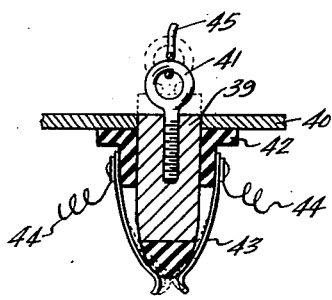
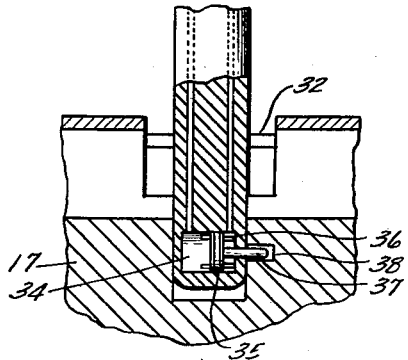
INVENTOR.
PAUL W. NOSKER
BY
ATTORNEYS Patented Feb. 12, 1952

2,585,030

UNITED STATES PATENT OFFICE 2,585,030

APPARATUS FOR LAUNCHING AERIAL TORPEDOES FROM AIRCRAFT

Paul W. Nosker, Yellow Springs, Ohio

Original application July 13, 1943, Serial No. 494,462. Divided and this application July 15, 1949, Serial No. 104,982

2 Claims. (Cl. 244—2)

(Granted under the act of March 3, 1883, as amended April 30, 1928; 370 O. G. 757)

The invention described herein may be manufactured and used by or for the Government for governmental purposes without payment to me of any royalty thereon.

This application is a division of application Serial No. 494,462 of Paul Nosker filed July 13, 1943, entitled Aerial Torpedo.

This invention relates to an apparatus for launching self-propelled torpedoes from an aircraft.

One object of the invention is to provide a mother aircraft which is modified for the safe and convenient launching of self-powered aerial torpedoes or guided missiles.

Another object is the provision of launching means attached to a mother aircraft for extending the missiles to be launched in a downwardly and forwardly pointed direction so that they may take off without endangering the mother aircraft.

Another object is the provision of launching doors which may act as a support for the aircraft while being launched and which may be opened during the launching so as to offer a clear and unobstructed opening in the fuselage of the mother aircraft through which the launching can occur.

Another object of the invention is the provision of initiating means for placing in operation the motors or other power plants of the guided missiles just prior to launching.

Another object is the provision of automatic arming means by which the detonating circuits of the explosive charges are automatically armed during the active launching.

Another object is the provision of release means for the missiles operable by the same working fluid as the remainder of the launching means.

Referring to the drawings Fig. 1 is a side elevation partly in section of a fuselage of a mother aircraft showing the number of guided missiles therein, one of which is in the process of being launched. Successive launching positions subsequent to the first one are shown in dashed lines.

Fig. 2 is a cross section taken along the line 2—2 of Fig. 1 and in general shows an end view of the apparatus shown in Fig. 1. The form of the launching doors is indicated in dashed lines.

Fig. 3 is a side elevation partly in section of the hydraulic release means which fit into the top of the guided missile bodies, a fragment of which also appears in Fig. 3. The hydraulic retaining and releasing means are shown.

Fig. 4 is a vertical section of an arming pin which is intended to be pulled out from the body of a guided missile upon the launching of the latter. Spring clips which form the termini of the arming circuit are shown spread apart by the pin in full line and in dotted line when brought together by the spring tension.

Referring to Fig. 1, a cargo type airplane 10, only a part of which, the fuselage 11, is shown, is provided with conventional bomb-bay doors 12 hinged as at 13 (Fig. 2), and adapted to be opened or lowered by a hydraulic system which is not illustrated because well known. Fixed to the leveled floor 15 of the fuselage are rails 14 (Fig. 2) forming two or more tracks. Small cars 16, each carrying a torpedo 17, or other guided missile, may move along said tracks 14 to bring the torpedoes 17 one at a time to a position over the launching opening 18. Clamps (not shown) may be provided to hold the cars 16 and the torpedoes 17 against movement until the time for launching. Each door 12 has one or more rails or tracks 14a fixed on its inner side which is leveled. The rails 14a may be aligned with one of the other rails 14 when the doors are closed, so that the tracks become continuous upon closing the doors. Exact alignment of the rails and locking of the doors may be accomplished by inserting slidable pins on the ends of each rail 14a adjacent the door opening, said slidable pins 19 entering sockets 20 in the ends of rails 14a or doors 12. The cars 16 with their torpedoes 17 are rolled one at a time over the rails 14a and momentarily are supported by the closed doors 12. However, this extra load on the doors is quickly removed by lowering a torpedo-launching mechanism 21 having means to connect with and support a torpedo, which will now be described.

The torpedo-launching mechanism 21 comprises a compound (telescopic) hydraulic cylinder or other actuator 22 with its upper end hinged at as 23, to the fuselage 11 and having a piston rod 24 pivotally connected with and supporting a preferably double triangular frame 25. Parallel rods or legs 25a form an extension of frame 25 and their lower ends are locked to a torpedo 17 at spaced points, as will be described. With the torpedo 17 rigidly held by the launching mechanism 21, an electric starting motor 26 is provided slidably mounted on a stand 27 so that it can be manually moved toward the torpedo 17. Its automatically disengaging clutch 28 may be coupled momentarily with the propeller hub 29 of a torpedo or to start the power plant (not shown). The doors 12 meanwhile, have been opened and the torpedo 17 with its propellers in operation will be quickly lowered by the hydraulic cylinder 22. To tilt each torpedo so that it will have a negative angle of attack for assured launching, one or more pairs of links 30 are pivotally connected to the frame 25 at their free ends and at their opposite ends are pivoted as at points 31 to the fuselage 11. The location of the pivots and the lengths of links are such that frame 25 is slanted downward and forward through a small angle as the torpedoes 17 are lowered.

Each torpedo may have hinged covers (not shown) each closing an opening in the outer skin of the torpedo. Normally these covers remain closed under spring pressure to seal the openings to minimize drag. Such covers are conventional and may be omitted. When one of the supporting rods or legs 25a is thrust against a cover it will open and permit the rod to be moved down into a socket 32 in the structural member. Each rod contains two hydraulic tubes 33 which may connect with a hydraulic system (not shown) similar to the door-operating system, or else a part of the latter, and in either case controlled by valves (not shown) worked from the interior of the airplane. Near the lower end each rod or leg 25a has a chamber 34 in which a hydraulic piston 35 reciprocates and into which the tubes 33 connect. Stops 36 on each side of the piston prevent it from moving so far in either direction as to shut off liquid flow. A locking pin 37 or piston shaft which may be affixed to the piston, enters a recess 38 in the structural member to lock the rod or leg 25a to the torpedo when the piston 35 is in the position shown in Fig. 3. However, when the piston 35 is moved in the other direction the pin or shaft 37 will move out of the recess 38 to release the torpedo 17 since all tubes 33 in all legs 25a are connected to the same hydraulic system, release of each of the legs 25a will be substantially simultaneous. When the rods slide out of the openings the covers will close automatically.

Since it would be dangerous to store the torpedoes armed, means for arming them at the instant of launching has been provided and is shown in Fig. 4. This means cooperates with the remainder of the launching apparatus as will be described.

A plug 39 is composed wholly or partly of insulating material and is faired into the skin 40 of the top surface of a torpedo 17. It is provided with an eyebolt 41 which projects above the skin 40. An insulating ring 42 is provided below the skin for the reception of the plug 39 which bears switch prongs 43, preferably of beryllium copper. These are so tensioned that upon removal of the plug, the prongs 43 will contact each other, thus creating a continuous electric circuit 44 which is the detonating circuit for the torpedo warhead (not shown). A cable 45 is attached to both the eyebolt 41 and some member, say 25, of the launching device or other point in the cargo airplane. When the torpedo is launched, the plug 39 is pulled out of the torpedo. The prongs come together as shown in dotted line in Fig. 4; the torpedo is then armed.

The described launching mechanism delivers the armed torpedoes ready to fly, one at a time below the airplane, with a negative angle of attack so that they will clear the airplane when launched. It will be understood that a number of torpedoes may be stored on racks or the like, inside the airplane at various points.

The car 16 after the removal of the torpedoes therefrom may be manually or otherwise pushed back toward the rear of the aircraft from the position over the closed doors before the doors are opened. However, military necessity may dictate a high-speed operation, in which case the empty car 16 may be jettisoned upon opening of the doors 12.

In the appended claims, the term "mother aircraft" means the cargo airplane 10 or its equivalent, while "parasite aircraft" means the torpedo 17, or its equivalent, which may be a jet propelled, radio or radar-guided missile.

What I claim is:

1. In combination, a parasite aircraft, a plurality of holding sockets with a detent in each socket on said aircraft, a launching device comprising a parallel bar linkage, legs extending downward from said linkage into said sockets, a piston and cylinder therefor arranged crosswise of each leg at substantially the outer end thereof, a fluid inlet passage to said cylinder, and a fluid outlet passage from said cylinder both extending downward through said leg whereby said piston may be releasably forced by fluid pressure by its shaft into said detent in said socket and retained there to hold said leg in said socket until the fluid pressure on said piston is released.

2. In combination, a mother aircraft having a bomb bay door opening, a powered parasite aircraft contained within the mother aircraft, a plurality of holding sockets with a detent in each socket on said parasite aircraft, a launching device carried within the mother aircraft, said launching device comprising a parallel bar linkage, legs extending downward from said linkage into said sockets, a piston and cylinder therefor arranged crosswise of each leg at substantially the outer end thereof, a fluid inlet passage to said cylinder and a fluid outlet passage from said cylinder both passages extending downward through said leg whereby said piston may be releasably forced by fluid pressure by its shaft into said detent in said socket and retained there to hold said leg in said socket until the fluid pressure on said piston is released and a telescopic actuator of the power type for pivoting the parallel bar linkage as a whole about a pair of pivot points within the mother aircraft and adapted to project the parasite aircraft at a negative angle of attack through a bomb bay door opening on the mother aircraft, said actuator and said pistons in the holding sockets being actuable by the same type of working fluid.

PAUL W. NOSKER.

REFERENCES CITED

The following references are of record in the file of this patent:

UNITED STATES PATENTS

| Number | Name | Date |
|---|---|---|
| 1,313,693 | Hucks | Aug. 19, 1919 |
| 1,353,518 | Chmielarski | Sept. 21, 1920 |
| 1,547,912 | Hall | July 28, 1925 |
| 1,627,185 | Krammer | May 3, 1927 |
| 1,648,904 | Kesses | Nov. 15, 1927 |
| 1,672,163 | Krammer | June 5, 1928 |
| 1,687,000 | Abreu | Oct. 9, 1928 |
| 1,834,840 | Holt | Dec. 1, 1931 |
| 2,029,778 | Krammer | Feb. 4, 1936 |
| 2,339,011 | Gurney | Jan. 11, 1944 |
| 2,362,345 | Bertran | Nov. 7, 1944 |
| 2,399,217 | Fahrney | Apr. 30, 1946 |
| 2,409,210 | Jolly | Oct. 15, 1946 |

FOREIGN PATENTS

| Number | Country | Date |
|---|---|---|
| 419,563 | Great Britain | Nov. 14, 1934 |